United States Patent
Takahashi et al.

(10) Patent No.: US 11,597,272 B2
(45) Date of Patent: Mar. 7, 2023

(54) FILLER HEAD ALLOWING A RELIABLE REFILLING WITHOUT SPITTING

(71) Applicants: Plastic Omnium Advanced Innovation and Research, Brussels (BE); TOYOTA JIDOSHA KABUSHIKI KAISHA, Toyota (JP)

(72) Inventors: Keita Takahashi, Brussels (BE); Yasunari Tsuzuku, Toyota (JP)

(73) Assignees: Plastic Omnium Advanced Innovation and Research, Brussels (BE); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/789,719

(22) PCT Filed: Jan. 29, 2021

(86) PCT No.: PCT/EP2021/052077
§ 371 (c)(1),
(2) Date: Jun. 28, 2022

(87) PCT Pub. No.: WO2021/152071
PCT Pub. Date: Aug. 5, 2021

(65) Prior Publication Data
US 2023/0030036 A1    Feb. 2, 2023

(30) Foreign Application Priority Data
Jan. 31, 2020    (EP) ...................................... 20154884

(51) Int. Cl.
*B60K 15/077*    (2006.01)
*B60K 15/035*    (2006.01)
(Continued)

(52) U.S. Cl.
CPC ............. *B60K 15/077* (2013.01); *B60K 15/03* (2013.01); *B60K 15/035* (2013.01); *B60K 15/04* (2013.01);
(Continued)

(58) Field of Classification Search
CPC ............ B60K 15/04; B60K 2015/0458; B60K 2015/03538; B60K 2015/03552;
(Continued)

(56) References Cited

U.S. PATENT DOCUMENTS 5,860,460 A * 1/1999 Hidano .................. B60K 15/04
141/286
10,093,175 B2    10/2018 Kito et al.
(Continued)

FOREIGN PATENT DOCUMENTS

| CN | 103573349 A | 2/2014 |
|---|---|---|
| CN | 106427542 A | 2/2017 |

(Continued)

OTHER PUBLICATIONS

International Search Report dated Apr. 20, 2021 in PCT/EP2021/052077 filed Jan. 29, 2021, 3 pages.
(Continued)

*Primary Examiner* — Shawn M Braden
(74) *Attorney, Agent, or Firm* — Oblon, McClelland, Maier & Neustadt, L.L.P.

(57) ABSTRACT

A filler head for a storage system includes a body to be mounted inclined according to a predetermined angle regarding the gravity direction, called the filling direction, and including a main part closed by a cover part so as to form a cavity in which a separating device is received, the filler head being configured to receive, in a cylindrical wall of the separating device extending around the filling direction, a distribution nozzle of a fluid with an automatic stop (Continued)

sensor to prevent overfilling of the filler head, the separating device being arranged to improve the partitioning of a flow coming from a venting line and the flow going to the filling line. The separating device further includes a flange, protruding transversally from the outside surface of the cylindrical wall and mounted in the cavity upstream of the sensor of the nozzle when received in the cylindrical wall.

10 Claims, 3 Drawing Sheets

(51) Int. Cl.
  *B60K 15/03* (2006.01)
  *B60K 15/04* (2006.01)
(52) U.S. Cl.
  CPC .......... *B60K 2015/0346* (2013.01); *B60K 2015/03368* (2013.01); *B60K 2015/03538* (2013.01); *B60K 2015/0458* (2013.01)
(58) Field of Classification Search
  CPC .. B60K 2015/03576; B60K 2015/0461; B60K 15/077; B60K 15/03; B60K 15/035; B60K 2015/03368; B60K 2015/0346
  See application file for complete search history.

(56) References Cited

U.S. PATENT DOCUMENTS

| | | | | |
|---|---|---|---|---|
| 10,245,942 | B2 * | 4/2019 | Hagen | B60K 15/04 |
| 10,857,876 | B2 * | 12/2020 | Myers | B60K 15/04 |
| 11,065,954 | B2 * | 7/2021 | Koga | B60K 15/04 |
| 2010/0200115 | A1 | 8/2010 | Santinon | |
| 2013/0306665 | A1 | 11/2013 | Eberhardt et al. | |
| 2016/0068063 | A1 * | 3/2016 | Aso | B60K 15/04 |
| | | | | 220/86.2 |
| 2017/0036533 | A1 | 2/2017 | Hagen | |
| 2021/0008780 | A1 | 1/2021 | Rausch | |

FOREIGN PATENT DOCUMENTS

| | | |
|---|---|---|
| EP | 2 927 040 B1 | 6/2016 |
| WO | 2019/149824 A1 | 8/2019 |
| WO | WO 2019/149750 A1 | 8/2019 |

OTHER PUBLICATIONS

Indian Office Action dated Sep. 19, 2022 in Indian Patent Application No. 202247048709, 6 pages.
Japanese Office Action issued in Japanese Patent Application No. 2022-544379 dated Dec. 19, 2022, citing document 15 therein, (w/ English Translation).

* cited by examiner

FILLER HEAD ALLOWING A RELIABLE REFILLING WITHOUT SPITTING

FIELD OF THE INVENTION

The invention relates to a filler head allowing a reliable refilling with a nozzle (automatic or not) of a fluid tank, such an automotive tank, without spitting, i.e. without any fluid that spits back from the filler head during refilling stage.

BACKGROUND OF THE INVENTION

Legislation on vehicle and truck emissions stipulates, amongst other things, a reduction in the release of nitrogen oxides $NO_x$ into the atmosphere. One known way to achieve this objective is to use the "SCR" (shortening from terms "Selective Catalytic Reduction") process which enables the reduction of nitrogen oxides by injection of a reducing agent, such as ammonia, into the exhaust line. Generally, a SCR system comprises a tank for the storage of an aqueous additive, such as a urea solution, a pump for conveying the aqueous additive in the feed line, and a device for metering the desired amount of aqueous additive and injecting it into the exhaust line. The aqueous additive is thus accurately metered and injected into the exhaust gas stream where it is hydrolysed before converting the nitrogen oxide ($NO_x$) to nitrogen ($N_2$) and water ($H_2O$).

The distribution of urea solution, sometimes called adblue®, is known for trucks for many years. The tank volume being important in the range of trucks, it has been developed distribution system apart from fuel delivery with a filling rate of 40 $l·min^{-1}$ and urea tanks with large inlet diameter.

Regarding passenger cars, initial market demand was to design filler heads compatible for manual filling with a screw-on bottle. The filling was done by gravity and was usually slow around 3 $l·min^{-1}$. However, due to the urea solution consumption increasing because of stricter depollution levels, it becomes more common to regularly fill the urea solution tank. However, consumers have noticed that they could already be supplied with the dispensers for trucks and thus have imposed a unique delivery rate in contrast to what was contemplated.

As a result, carmakers now request to design SCR systems compatible with automatic filling technology initially designed for heavy duty application as well as with manual filling. Known filler heads are disclosed in documents WO 2019/149750, US 2013/306665 and US 2017/036533.

Moreover, at this moment, three kinds of automatic filling technologies are mainly used depending on the sensor included in the nozzle (ZVA nozzle sensor, Horn nozzle sensor or PIUSI nozzle sensor). Each sensor is not mounted at the tip of the nozzle (as ZVA nozzle) but may also be mounted in the upstream direction of the nozzle (as Horn and PIUSI nozzle sensors) up to 16 mm from the tip.

Consequently, a lot of conflicting specifications have to be met such as a small diameter of the existing screw-on bottles with a high rate of filling up to 40 $l·min^{-1}$ whatever the kind of sensor used in the nozzle.

SUMMARY OF THE INVENTION

The invention aims to provide a filler head that meets these conflicting specifications without any spitting from the filler head during refilling stage.

Hence, the invention relates to a filler head for a storage system comprising a body to be mounted inclined according to a predetermined angle regarding the gravity direction, called the filling direction, and including a main part closed by a cover part so as to form a cavity in which a separating device is received, the filler head being configured to receive, in a cylindrical wall of the separating device extending around the filling direction, a distribution nozzle of a fluid with an automatic stop sensor to prevent overfilling of the filler head, the filler head being configured to be connected to a filling line and a venting line of a fluid tank and the separating device being arranged to improve the partitioning of the flow coming from the venting line and the flow going to the filling line, the separating device further comprising at least one flange, protruding transversally from the outside surface of the cylindrical wall and mounted in the cavity upstream of the sensor of the nozzle when received in the cylindrical wall and considering the filling direction, so as to ensure the fluid outgoing from the nozzle present in the filler head has limited possibility to spit back from the filler head without affecting the sensor work, characterised in that the flange of the separating device is mounted between a back portion of the body and a front portion of the body, located in an opposite direction to the back portion when considering the filling direction to form a shield substantially above all the upper surface of the fluid present in the filler head and in that the venting line is connected with the filler head in the back portion of the body and the lowest half cylindrical wall when considering the gravity direction has no through recess downstream of the flange when considering the filling direction on the external surface facing the front portion of the body so as to ensure a laminar flow of the fluid from the nozzle received in the cylindrical wall towards the filling line.

According to the invention, the flange forms a dead volume between it and the upper part of the cover part so as to receive eventual passing fluid before reaching the top of the cover part. In other words, the dead volume forms an additional volume to eventually store the fluid that has been slowed by contact with the flange to avoid the spitting from the filler head before and during the nozzle shut off. Therefore, the nozzle shut off is improved notably because the sensor is able to sense fluid pressure in the filler head quicker without any spitting. This configuration of the flange also increases the difficulty of the fluid in reaching the dead volume. Moreover, by gravity and due to the predetermined angle regarding the gravity direction of the body, the fluid outgoing from the nozzle flows along the internal diameter of the cylindrical wall to the filling line without encountering any roughness such as any bump or recess allowing a better guidance of the fluid to the filling line.

The invention may also include one or more of the following optional features, taken alone or in combination.

The flange of the separating device may comprise at least one through hole between the front part of the body and the cylindrical wall so as to allow any fluid present above the flange to flow by gravity between the front portion of the body and the cylindrical wall. In other word, by gravity and due to the predetermined angle regarding the gravity direction of the body, any fluid present in the dead volume is able to flow in said through hole between the cylindrical wall and the front portion of the body to avoid disturbance of the sensor.

The cover part may comprise a protruding guiding element to guide the distribution nozzle to the separating device so as to allow a better mechanical protection of the cylindrical wall. Preferably, the protruding guiding element is closed in a sealed manner by a cap when nozzle is not received in the separating device.

The filler head may further comprise a buffer volume in one-piece with the main part of the body so as to reduce the speed of flow coming from the venting line. This configuration allows a further improvement regarding the aim of avoiding any spitting from the filler head.

The separating device is preferably removable so as to be replaceable. The separating device can thus be replaced with a different geometry to fit another kind or dimensions of nozzle and/or tank.

The cylindrical wall further comprises preferably at least one hole that allows the flow of air coming from the venting line to pass through the cylindrical wall in order to be expelled outside the filler head. This allows a more reliable refilling by venting the air of the tank outside the filler head permitting the fluid outgoing from the nozzle to more freely flows to the tank via the filling line.

According to a first example, the cover part can be secured to the main part in a sealed manner by welding. Thus, a unique welding is used during the manufacturing process allowing the improvement of cycle time and associated costs.

According to a second example, the cover part can be secured to the main part in a sealed manner by snap-fitting a sealing ring between the cover part and the main part. Thus, the manufacturing process can avoid the use of welding step allowing an easier process.

The invention relates to a storage system comprising a fluid tank connected to a filling line configured to guide the gravitational flow of fluid from a filler head to the tank and a venting line configured to compensate de pressure variations in the tank, characterised in that the storage system further comprises the filler head according to any one of the preceding embodiments.

BRIEF DESCRIPTION OF THE DRAWINGS

Other features and advantages of the present invention will appear more clearly upon reading the following detailed description, made with reference to the annexed drawings, provided as a non-limited description, in with.

DETAILED DESCRIPTION OF THE PREFERRED EMBODIMENTS

In the various figures, the same or similar elements bear the same references, optionally added with an index. The description of their structure and their function is therefore not systematically restated.

In all the following, the orientations are the usual orientations of a motor vehicle. In particular, the terms "upper", "lower", "left", "right", placed above, and below, forwards and backwards in relation to the direction of the figures.

It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The term "tank" is understood to mean an impermeable tank that can store fluid under versatile and various environmental and usage condition. An example is a fuel tank for providing fuel (gasoline, diesel, hydrogen, etc.) to a motor vehicle. The term "tank" may also apply to urea tank or water tank.

The expression "SCR system" is understood to mean a system for the catalytic reduction of the NOx from the exhaust gases of an internal combustion engine, preferably of a vehicle, using for example an aqueous urea solution as liquid additive. The present invention is advantageously applied to diesel engines, and in particular to the diesel engines of passenger cars or heavy goods vehicles.

Moreover, the urea distribution nozzle can be introduced in a fuel filler head. Thus, valves for distribution nozzles activated by a magnetic field have been developed. Therefore, when applying to urea tank, filler head must have a magnetic element for activating the valve and allowing the delivery of urea.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 1:
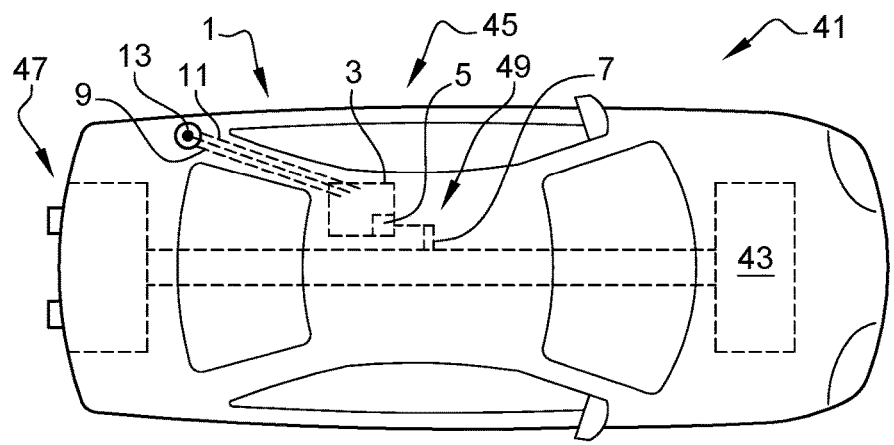
FIG. 1 is a top schematic view of a vehicle in which the present invention may be applied.
Figure 2:
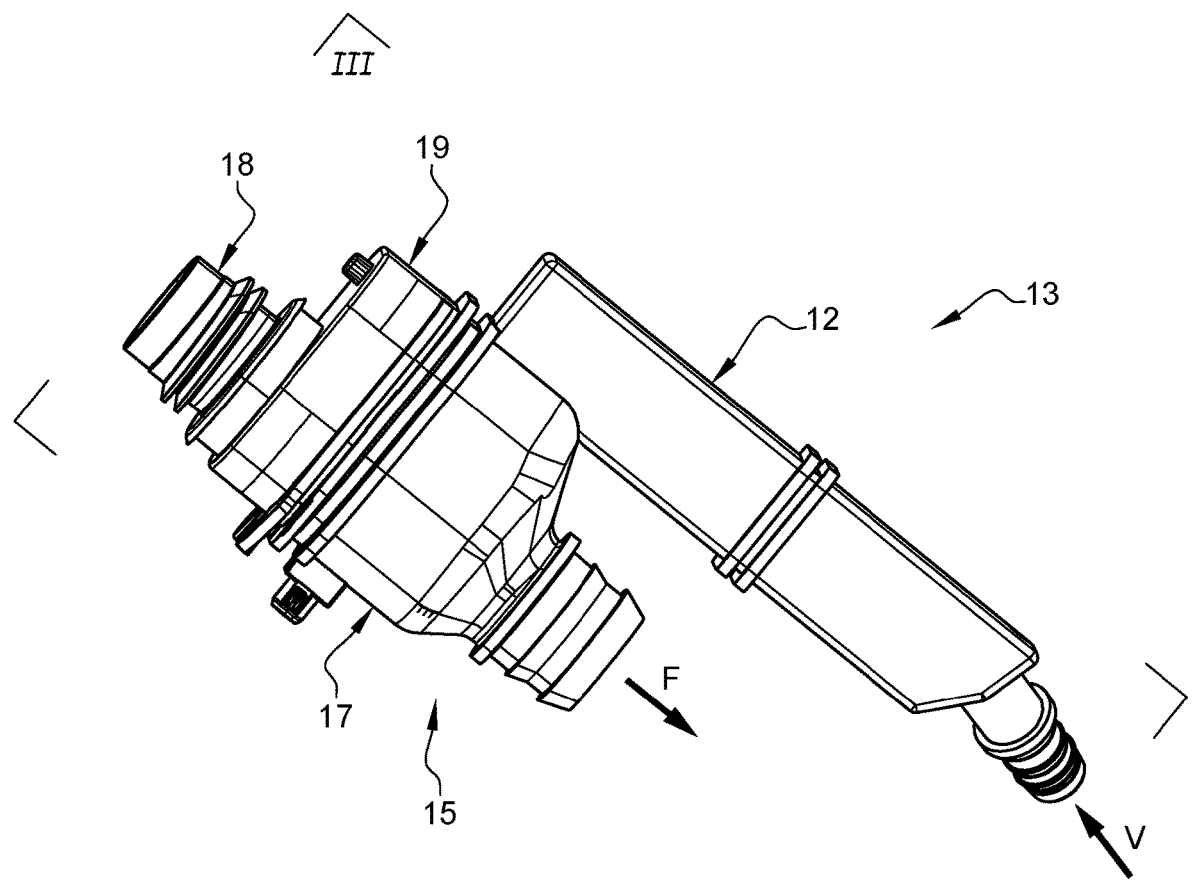
FIG. 2 is a perspective view of a filler head according to the invention.

As illustrated in FIG. 1, the invention relates to a vehicle 41 equipped with a powertrain 43 connected to a depollution system 45. More precisely, the depollution system 45 comprises an exhaust device 47 and an additive injection device 49 in the exhaust device 47 as, for example, a urea solution.

The injection device 49 comprises a storage system 1 including a tank 3 for storing an aqueous additive. The injection device 49 may also include, or not, a plurality of immersed sensors in the aqueous additive such as a level sensor, a temperature sensor and/or a quality sensor which can be of a capacitive effect type, of the ultrasound type or of the mechanical type.

The injection device 49 also comprises a pump 5 associated with an injection element 7 which are managed by a processing unit connected to the central computer of the vehicle 41. The processing unit contains a memory in which coded instructions are stored. When coded instructions are executed by the processing unit, the steps, for example, of an SCR process are performed.

The tank 3 must be regularly refilled with an aqueous additive such as a urea solution or an ammonia solution. The storage system 1 thus comprises a filling line 9, a venting line 11 (also called return line) and a filler head 13. The filling line 9 is configured to guide the gravitational flow of fluid from the filler head 13 to the tank 3. The venting line 11 is configured to compensate pressure variations in the tank 3 during refilling by expelling, from the filler head 13, the fluid (mainly gas comprising air and eventually vapour of liquid contained in the tank 3) contained in the tank 3 that is compressed by the arrival of fluid coming from the filling line 9 in the tank 3.

Finally, the filler head 13 is configured to receive the nozzle (not shown) of fluid distribution system and to be connected, preferably in a sealed manner, to the filling line 9 and the venting line 11. The filler head 13 thus allows, during refilling period, the fluid outgoing from the nozzle to flow into the tank 3 via the filling line 9 and, at the same time, allows the fluid present above the liquid in the tank 3, to be expelled from the tank 3 via the venting line 9 to escape into the ambient air (external atmosphere) around the vehicle 41.

The invention aims to provide a filler head 13 that meets the hereinbefore conflicting specifications, such as a small diameter of the existing screw-on bottles with a high rate of filling up to 40 l·min$^{-1}$ whatever the kind of sensor used in the nozzle, without any spitting from the filler head 13 during refilling stage.

Hence, the filler head 13 according to the invention comprises a body 15 to be mounted inclined according to a predetermined angle α (alpha) regarding the gravity direction G that is called the filling direction F hereinafter (see FIG. 3). According to the invention, the predetermined angle α (alpha) may be comprised between 0° and 60° when considering the gravity direction G. This angle range allows a good flow with help of the gravity together with an easy introduction of a distribution nozzle (not shown) in the filler head 13.

The filler head 13 comprises a main part 17 closed by a cover part 19 so as to form a cavity 20. According to a first example, the cover part 19 may be secured to the main part 17 in a sealed manner by welding. Thus, a unique welding is used during the manufacturing process allowing the improvement of cycle time and associated costs.

According to a second example, the cover part 19 may be secured to the main part 17 in a sealed manner by snap-fitting a sealing ring (not shown) between the cover part 19 and the main part 17. Thus, the manufacturing process can avoid the use of welding step allowing an easier process.

The cover part 19 may comprise a protruding guiding element 18 to guide the distribution nozzle to a separating device 21 (as explained below) so as to allow a better mechanical protection of its cylindrical wall 23. Preferably, the protruding guiding element 18 is closed in a sealed manner by screwing a cap (not shown) when nozzle is not received in the separating device 21.

Figure 3:
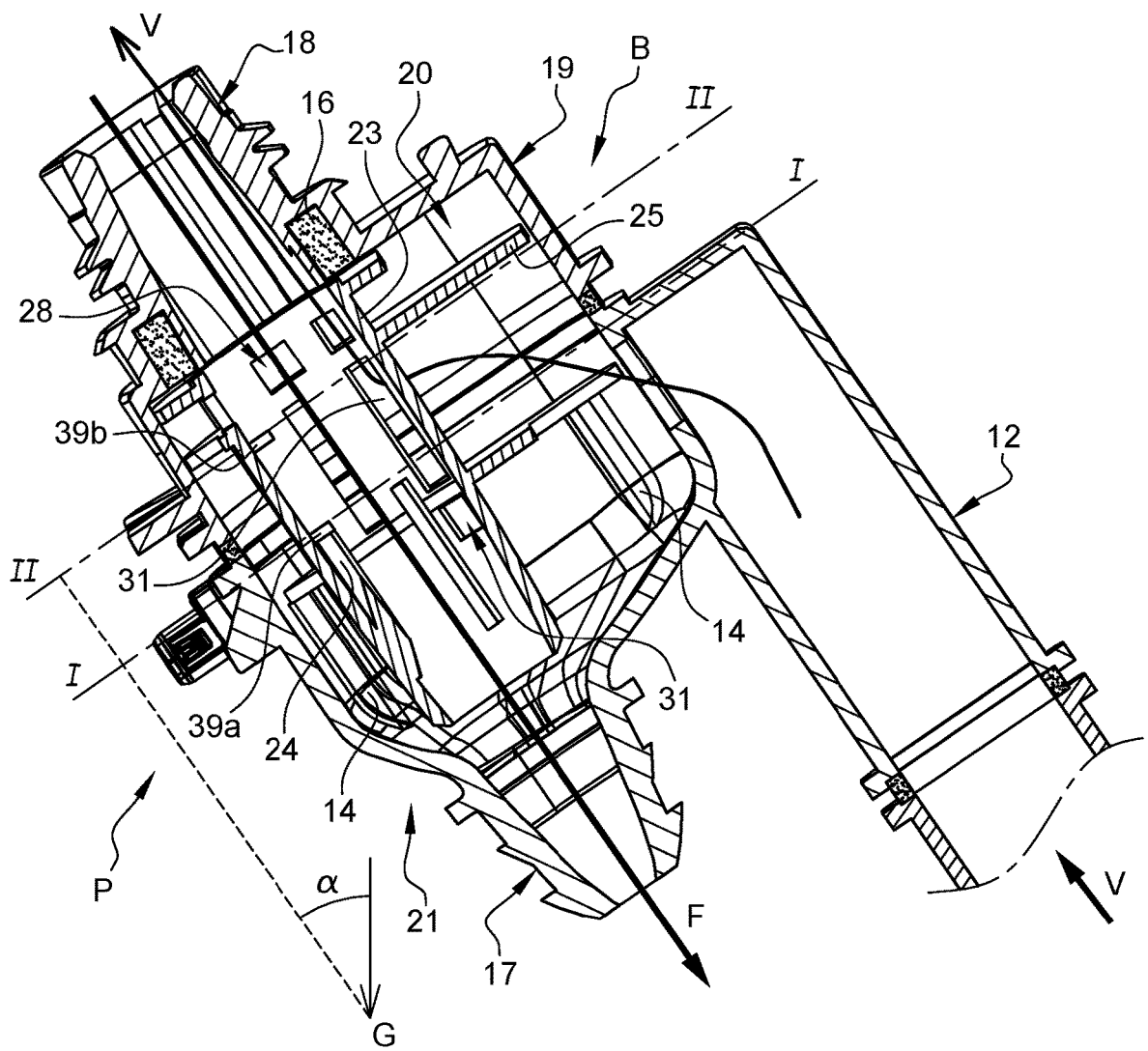
FIG. 3 is a cross-sectional view along the plane III-Ill of FIG. 2.
Figure 4:
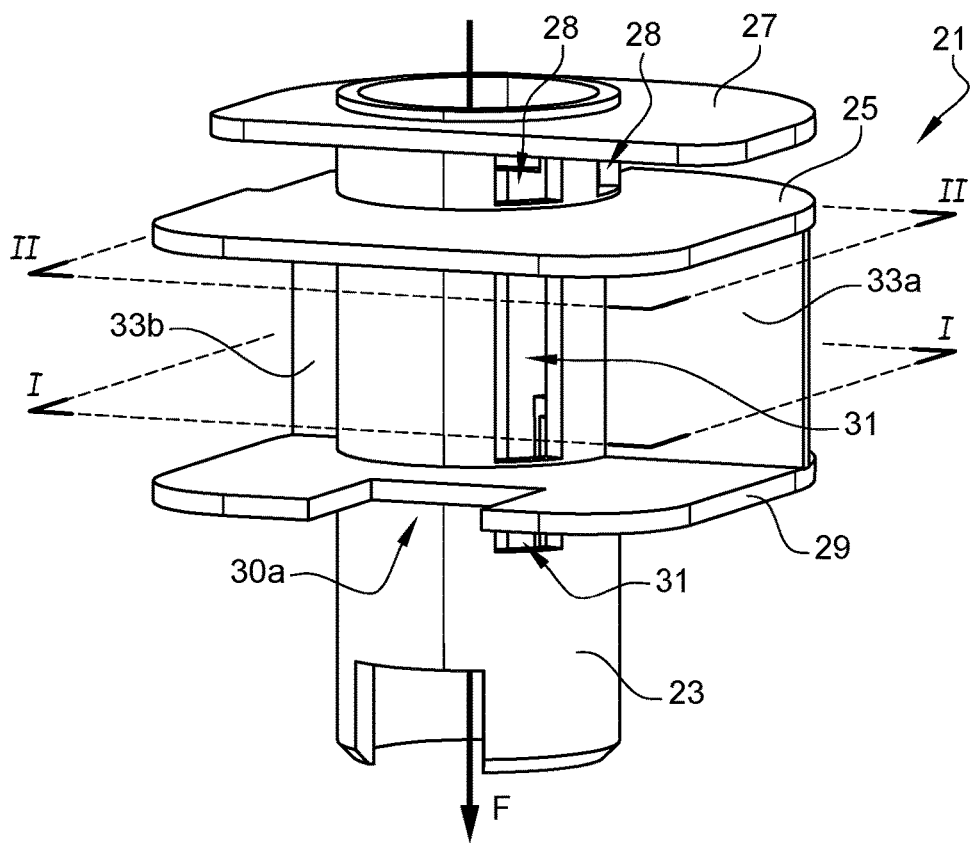
FIGS. 4 and 5 are perspective views of a separation device according to the invention.
Figure 5:
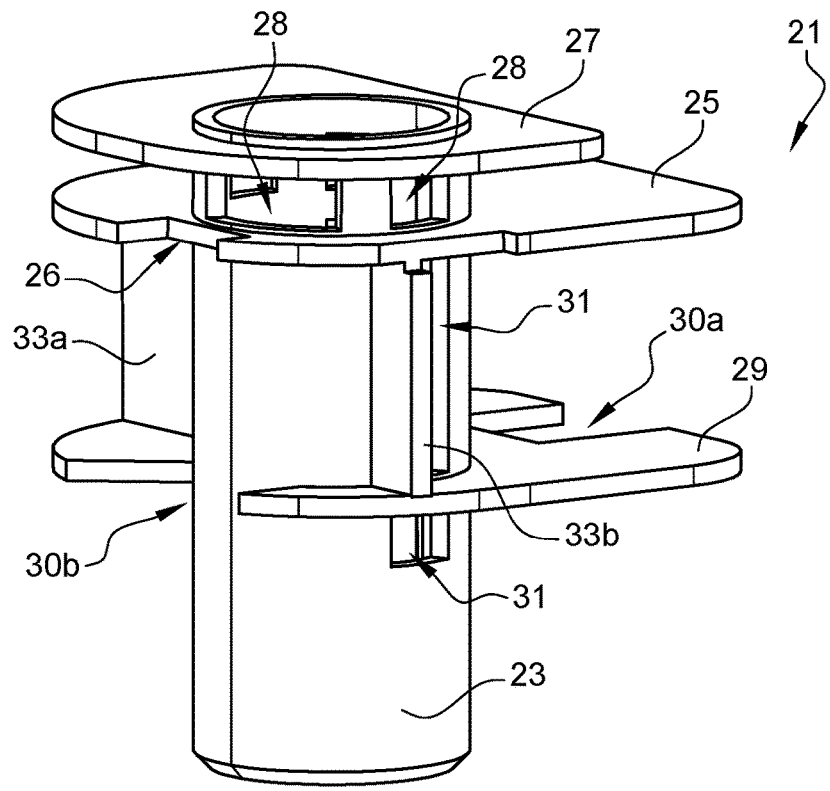

As illustrated in FIG. 3, the cover part 19 may include the magnet 16 circumferentially of the protruding guiding element 18 so as to activate, by a magnetic field, the valve of the nozzle when the tank 3 is of urea type permitting the delivery of urea.

The main part 17 may include a plurality of ribs 14 so as to receive the separating device 21 against the upper end of each rib 14. Thus, the separating device 21 can be easily removable from the cavity 20 so as to be replaceable. The separating device 21 can thus be replaced with a different geometry to fit another kind or dimensions of nozzle and/or tank 3.

The filler head 13 may further comprise a buffer volume 12 in one-piece with the main part 17 in a back portion of the body 15 so as to reduce the speed of flow V coming from the venting line 11. This configuration allows a further improvement regarding the aim of avoiding any spitting from the filler head. As function of the sensor type, the buffer volume 12 is comprised between 80 ml and 140 ml, preferably between 90 ml and 130 ml and more preferably between 94 ml and 129 ml. More precisely, the more upstream is the sensor of the nozzle when considering the filling direction F, the bigger the buffer volume 12 is.

According to the invention, the separating device 21, preferably hung in the cavity 20 of the body 15, is configured to receive, in its cylindrical wall 23 extending around the filling direction F, the distribution nozzle. The separating device 21 is arranged to improve the partitioning of the flow V coming from the venting line 11 and the flow F going to the filling line 9. Thus, as illustrated in FIG. 3, sensor 39$a$ mounted at the tip of the nozzle (plane I as ZVA nozzle sensor) is lower in the filler head 13 than that 39$b$ mounted in the upstream direction of the nozzle when considering the filling direction F (plane II as Horn and PIUSI nozzle sensors) which may be introduced up to 16 mm from the tip.

According to a first aspect of the invention, the separating device 21 further comprises at least one flange 25, protruding transversally from the outside surface of the cylindrical wall 23 and mounted in the cavity 20 upstream of the sensor 39$a$ or 39$b$ of the nozzle when received in the cylindrical wall 23 and considering the filling direction F. This configuration of the flange 25 ensures the fluid outgoing from the nozzle present in the filler head 13 to have limited possibility to spit back from the filler head 13 without affecting the sensor 39$a$ or 39$b$ work.

According to the first aspect of the invention, the flange 25 forms a dead volume in the cavity 20 between the flange 25 and the upper part of the cover part 19 so as to receive eventual passing fluid before reaching the top of the cover part 19. In other words, the dead volume forms an additional volume to eventually store the fluid that has been slowed by contact with the flange 25 to avoid the spitting from the filler head 13 before and during the nozzle shut off. Therefore, the nozzle shut off is improved notably because the sensor is able to sense fluid pressure in the filler head 13 quicker without any spitting.

The flange 25 of the separating device 21 may be mounted between a back portion B of the body 15 and a front portion P of the body 15, located in an opposite direction to the back portion B when considering the filling direction F. This configuration permits to form a shield substantially above all the upper surface of the fluid present in filler head 13. In other words, it increases the difficulty of the fluid in reaching the dead volume above the flange 25.

In a second aspect of the invention, the venting line 11 is connected with the filler head 13 in the back portion B of the body 15. More precisely, the cylindrical wall 23 comprises at least one recess 31 facing the opening of the buffer volume 12 in the back portion B of the body 15 and the cylindrical wall 23 guides, along the front portion P of the body 15, any fluid outgoing from the nozzle so as to ensure a laminar flow F of the fluid outgoing from the nozzle towards the filling line 9 in the front portion P of the body 15, and a direct venting V of fluid through the cylindrical wall 23 in the back portion B of the body coming from the venting line 11. This configuration thus permits to limit any fluid dispensing shut off/breakdown during refilling stage.

According to the second aspect of the invention, the buffer volume 12 can thus be as far as possible from the tank 3. Advantageously, a better reduction of the speed of the flow V coming from the venting line 11 is obtained as well as a better bursting of the air bubbles along the wall of the buffer volume 12 regardless the volume of the tank 3 and/or the refilling rate. Moreover, with help of the separating device 21, the flows F, V are advantageously better partitioned in the cavity 20 between a flow F of fluid outgoing from the nozzle in the front part P of the cavity 20 in the body 15 and a flow V of fluid coming from the venting line 11 in the back part B of the cavity 20 in the body 15 so as to avoid the activation of the stop function of the distribution nozzle until the tank is effectively full.

The separating device 21 preferably further comprises upper and lower flange 27, 29 each mounted facing a side of the flange 25 and transversal plates 33a, 33b each mounted between flanges 25 and 29 and the external surface of the cylindrical wall 23. The transversal plates 33a, 33b allows a better partitioning between the front portion P and the back portion B of the body 15.

Preferably, the lowest half of the cylindrical wall 23 when considering the gravity direction G, i.e. the arcuate surface of the cylindrical wall 23, parallel to the filling direction F, and extending over the angle perpendicularly regarding the filling direction F between the transversal plates 33a, 33b and facing the front portion P of the body 15, has no through recess downstream of the flange 25. More generally, the lowest half of the cylindrical wall 23 has no recess in the planes I and II when the nozzle is fully received in the cylindrical wall 23 when considering the filling direction F, i.e. when tip of the nozzle abuts against upper part of ribs 24 (near the plane I) protruding from the internal surface of the cylindrical wall 23. This configuration ensures a laminar flow F of the fluid received in the cylindrical wall 23 towards the filling line 9. In other word, by gravity and due to the predetermined angle regarding the gravity direction G of the body 15, the fluid outgoing from the nozzle flows along the internal diameter of the cylindrical wall 23 to the filling line without encountering any roughness such as any bump or recess allowing a better guidance of the fluid to the filling line.

The flange 25 of the separating device 21 may comprise at least one through hole 26 between the front part P of the body 15 and the external surface of the cylindrical wall 23 so as to allow any fluid present above the flange 25, i.e. in the dead volume, to flow by gravity between the front portion P of the body 15 and the cylindrical wall 23. Similarly, the lower flange 29 of the separating device 21 may also comprise at least one through hole 30b between the front part P of the body 15 and the external surface of the cylindrical wall 23 so as to allow any fluid flowing by gravity from the through hole 26 to further flows between the front portion P of the body 15 and the lower end of the cylindrical wall 23. In other word, by gravity and due to the predetermined angle regarding the gravity direction G of the body 15, any fluid present in the dead volume is able to flow in said through holes 26, 30b between the cylindrical wall 23 and the front portion P of the body 15 to avoid disturbance of the sensor 39a or 39b.

In order to further improve the partitioning of the flow V coming from the venting line 11 and the flow F going to the filling line 9, the cylindrical wall 23 may further comprise at least one through recess 28 between the upper flange 27 and the flange 25.

Finally, the lower flange 29 may further comprise at least one hole 30a, located in an opposite direction to the hole 30b when considering the filling direction F and facing the opening of the buffer volume 12 in the back portion B of the body 15 so as to improve the direct venting V of fluid through the cylindrical wall 23 in the back portion B of the body coming from the venting line 11, i.e. to prevent any deviation of flow V between the buffer volume 12 and the cylindrical wall 23.

Of course, the present invention is not limited to the embodiments and variants presented but may be subjected to various other embodiments and/or variants, which will be apparent to those skilled in the art. Thus, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It is in particular possible to modify shapes and/or dimensions according to the particular application notably as function of the tank 3 type.

The invention claimed is:

1. A filler head for a storage system comprising a body to be mounted inclined according to a predetermined angle regarding the gravity direction, called the filling direction, and including a main part closed by a cover part so as to form a cavity in which a separating device is received, the filler head being configured to receive, in a cylindrical wall of the separating device extending around the filling direction, a distribution nozzle of a fluid with an automatic stop sensor to prevent overfilling of the filler head, the filler head being configured to be connected to a filling line and a venting line of a fluid tank and the separating device being arranged to improve the partitioning of the flow coming from the venting line and the flow going to the filling line, the separating device further comprising at least one flange, protruding transversally from the outside surface of the cylindrical wall and mounted in the cavity upstream of the sensor of the nozzle when received in the cylindrical wall and considering the filling direction, so as to ensure the fluid outgoing from the nozzle present in the filler head has limited possibility to spit back from the filler head without affecting the sensor work,
wherein the flange of the separating device is mounted between a back portion of the body and a front portion of the body, located in an opposite direction to the back portion when considering the filling direction to form a shield substantially above all the upper surface of the fluid present in the filler head and wherein the venting line is connected with the filler head in the back portion of the body and the lowest half cylindrical wall when considering the gravity direction has no through recess downstream of the flange when considering the filling direction on the external surface facing the front portion of the body so as to ensure a laminar flow of the fluid from the nozzle received in the cylindrical wall towards the filling line.

2. The filler head according claim 1, wherein the flange of the separating device comprises at least one through hole between the front part of the body and the cylindrical wall so as to allow any fluid present above the flange to flow by gravity between the front portion of the body and the cylindrical wall.

3. The filler head according to claim 1, in which wherein the cover part comprises a protruding guiding element to guide the distribution nozzle to the separating device.

4. The filler head according claim 3, wherein the protruding guiding element is closed in a sealed manner by a cap when nozzle is not received in the separating device.

5. The filler head according to claim 1, in which wherein the filler head further comprises a buffer volume in one-piece with the main part of the body so as to reduce the speed of flow coming from the venting line.

6. The filler head (13) according to claim 1, wherein separating device is removable so as to be replaceable.

7. The filler head according to claim 1, wherein the cylindrical wall further comprises at least one hole that allows the flow of fluid coming from the venting line to pass through the cylindrical wall in order to be expelled outside the filler head.

8. The filler head according to claim 1, wherein the cover part is secured to the main part in a sealed manner by welding.

9. The filler head according to claim 1, wherein the cover part is secured to the main part in a sealed manner by snap-fitting a sealing ring between the cover part and the main part.

10. A storage system comprising a fluid tank connected to a filling line configured to guide the gravitational flow of fluid from a filler head to the tank and a venting line configured to compensate de pressure variations in the tank,
wherein the storage system further comprises the filler head according to claim 1.

* * * * *